US008781985B2

(12) United States Patent
Subramanya

(10) Patent No.: US 8,781,985 B2
(45) Date of Patent: Jul. 15, 2014

(54) ADDRESSING SYSTEM DEGRADATION BY APPLICATION DISABLING

(75) Inventor: Keshava Subramanya, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 314 days.

(21) Appl. No.: 12/967,587

(22) Filed: Dec. 14, 2010

(65) Prior Publication Data

US 2012/0150785 A1    Jun. 14, 2012

(51) Int. Cl.
  *G06F 17/00* (2006.01)
  *G06N 5/02* (2006.01)

(52) U.S. Cl.
  USPC ............... 706/46; 726/23; 713/300; 713/188

(58) Field of Classification Search
  None
  See application file for complete search history.

(56) References Cited

U.S. PATENT DOCUMENTS

| 5,933,646 | A | 8/1999 | Hendrickson et al. | |
| 7,243,245 | B2 | 7/2007 | Pagan | |
| 7,712,137 | B2 | 5/2010 | Meier | |
| 8,528,086 | B1 * | 9/2013 | Aziz | 726/23 |
| 2004/0260956 | A1 * | 12/2004 | Pagan | 713/300 |
| 2005/0268112 | A1 * | 12/2005 | Wang et al. | 713/188 |

FOREIGN PATENT DOCUMENTS

| CN | 1728036 A | 2/2006 |
| CN | 1740945 A | 3/2006 |

OTHER PUBLICATIONS

Disable services you don't use on your PC to boost performance—Retrieved Date: Oct. 8, 2010 http://h20426.www2.hp.com/resources/smbtips/hk/en/disable_server_service.asp.
BatteryCare 0.9.7.3—Retrieved Date: Oct. 8, 2010 http://www.windows7download.com/win7-batterycare/yqokrtxm.html.
How to disable unused applications in WebSphere Portal v6.1.x.—Retrieved Date: Oct. 11, 2010 http://kaushalksinha.blogspot.com/2009/06/how-to-disable-unused-applications-in.html.
Speed-Trap—Retrieved Date: Oct. 8, 2010 http://www.speed-trap.com/techbenefits.aspx.
Disable Startup—Retrieved Date: Oct. 8, 2010 http://disable-startup.software.informer.com/.
Office Action mailed Jan. 13, 2014, in CN Pat. App. No. 201110417180.X, 10 pages including Concise Explanation of Relevance and/or partial translation.

* cited by examiner

*Primary Examiner* — Kakali Chaki
*Assistant Examiner* — Luis Sitiriche
(74) *Attorney, Agent, or Firm* — John Jardine; Andrew Sanders; Micky Minhas

(57) ABSTRACT

In some embodiments, a routine is executed that identifies one or more applications that consume resources of the computer without a benefit that justifies such consumption, with the routine comprising evaluating at least some data from a source external to the computer, and an ability of the one or more identified applications to start on the computer absent user input requesting or authorizing use of such an application is disabled. In some embodiments, the external source of data may, for example, comprise a remote database identifying potentially undesirable applications and/or a remote software reputation service. In some embodiments, a routine is executed that identifies one or more applications that consume resources of the computer without a benefit that justifies such consumption and that also identifies one or more resources or utilities that utilize the one or more applications. An ability of the one or more identified applications to start on the computer absent user input requesting or authorizing use of such an application is disabled, and an ability of the one or more resources or utilities to attempt to utilize the one or more applications absent user input requesting or authorizing such an attempt is also disabled.

20 Claims, 2 Drawing Sheets

ADDRESSING SYSTEM DEGRADATION BY APPLICATION DISABLING

BACKGROUND

End users often notice slowing down or "degrading" of their personal computers (PCs) over time. One of the most prevalent causes of such performance degradation is applications that are "always on." Because such applications continuously run, they steadfastly consume significant quantities of input/output (IO), central processing unit (CPU), memory, network and other resources. They may also cause user annoyance by trying to initiate a dialog with the user via system tray balloon tips, pop-up dialog boxes, etc. Common examples of such applications are expired trial versions of software, PC cleanup programs, screen savers bundled with toolbars, etc. A user generally has no way of knowing what kind of impact a given application might have on his or her machine at the time of installation, and also has no way of readily attributing a noticed degradation to a particular cause.

Users who notice PC performance degradation often resort to PC cleanup tools, registry cleanup utilities, anti-virus/antimalware tools, etc., to fix the problem. Such efforts, however, frequently cause further degradation of the system. Many users also resort to more aggressive methods like system restore, restoring a full PC backup, etc., which could potentially lead to loss of applications, data, and/or settings and generally fail to solve the underlying issues.

SUMMARY

In some embodiments, a routine is executed that identifies one or more applications that consume resources of the computer without a benefit that justifies such consumption, wherein the routine comprises evaluating at least some data from a source external to the computer, and an ability of the one or more identified applications to start on the computer absent user input requesting or authorizing use of such an application is disabled. The external source of data may, for example, comprise a remote database identifying potentially undesirable applications and/or a remote software reputation service.

In some embodiments, a routine is executed that identifies one or more applications that consume resources of the computer without a benefit that justifies such consumption and that also identifies one or more resources or utilities that utilize the one or more applications. An ability of the one or more identified applications to start on the computer absent user input requesting or authorizing use of such an application is disabled, and an ability of the one or more resources or utilities to attempt to utilize the one or more applications absent user input requesting or authorizing such an attempt is also disabled.

In some embodiments, a computer-readable medium has a plurality of instructions stored thereon that, when executed by a computer, cause the computer to perform a method that involves executing a routine that identifies one or more applications that consume resources of the computer without a benefit that justifies such consumption. The routine comprises evaluating at least some data from a source external to the computer and/or identifying one or more resources or utilities that utilize the one or more applications. An ability of the one or more identified applications to start on the computer absent user input requesting or authorizing use of such an application is disabled. For embodiments in which the routine comprises identifying one or more resources or utilities that utilize the one or more applications, an ability of the one or more resources or utilities to attempt to utilize the one or more applications absent user input requesting or authorizing such an attempt is also disabled.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
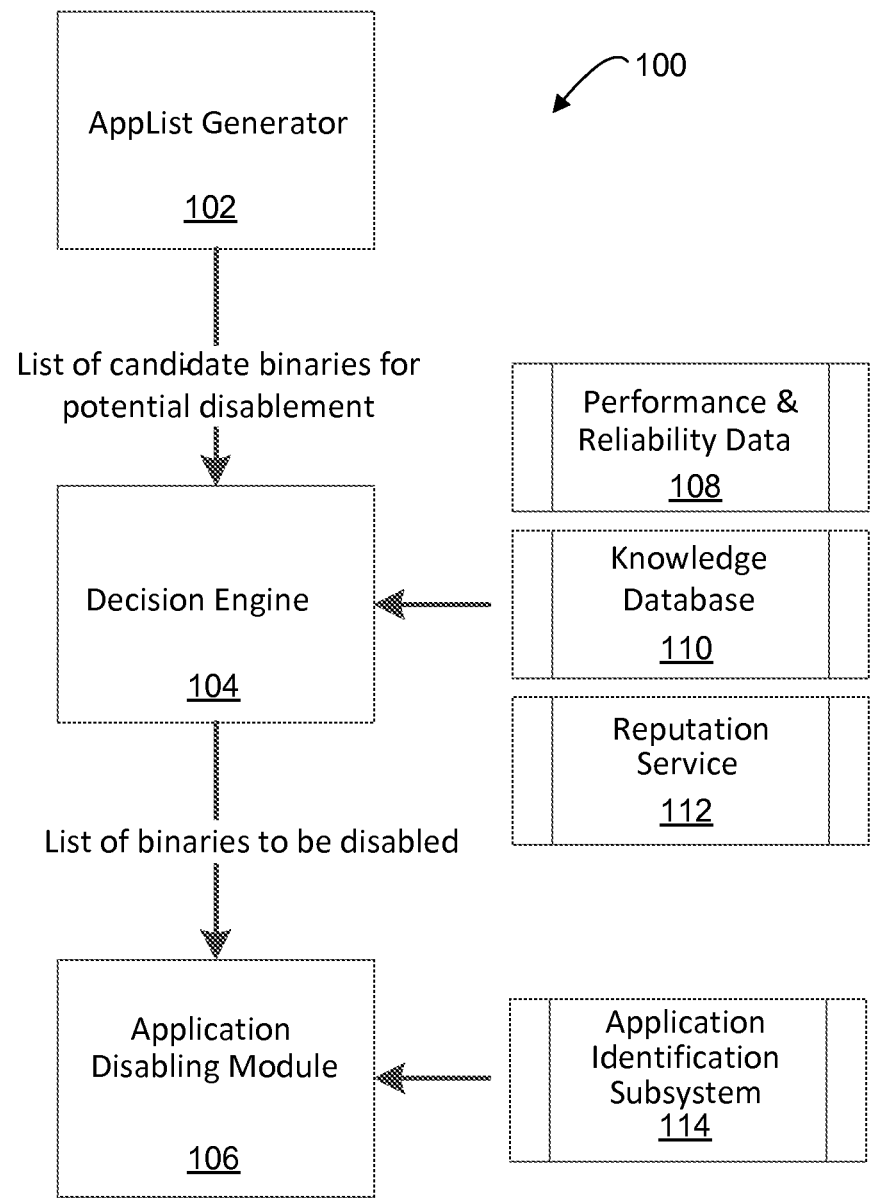
FIG. 1 is a functional block diagram showing examples of software modules that may be included in a system and that may be used to identify and disable undesirable applications that cause system degradation.

PC performance degradation can be ameliorated by identifying undesirable applications that cause system degradation and disabling them. Various novel systems, methods, and computer-readable media are described herein for accomplishing that objective. By using one or more of the disclosed techniques, either automatically in response to a system event or at the prompting of a user, undesirable applications that cause system degradation may be selectively disabled. This process is referred to herein as "rejuvenation."

Applications today have multiple ways of starting when the system starts. Examples of such starting mechanisms include logon registry keys, start menu\programs\startup, Internet Explorer®/IE extensions, scheduled tasks, services, drivers, boot executes, image hijacks, sidebar gadgets, etc. Many installers require User Account Control (UAC) elevation during installation and are free to launch themselves using one or more of the foregoing mechanisms. As these applications start during system startup, they may impact a variety of system metrics, including boot time.

The identification of applications to disable for rejuvenation purposes may be done in any of numerous ways, and the invention is not limited to the use of any particular identification methodology or technique. The basic goal of any such analysis, however, is to identify those applications that consume system resources without providing some desired benefit that justifies such consumption. In some embodiments, identification of applications meeting that criterion may be accomplished by collecting and evaluating performance and reliability data from a user's machine. Additionally or alternatively, in some embodiments, data may be obtained from one or more external sources to assist in identifying applications to disable. In some embodiments, for example, one or more remote databases may be queried for data identifying undesirable applications and/or one or more remote ratings services may be consulted to obtain ratings and/or analyses provided by others relating to their knowledge of, or experiences with, particular pieces of software. Examples of suitable external resources that may be used for such purposes include the database of potentially unwanted software, maintained by the Microsoft® Security Engineering Center (MSEC), that is used by the Microsoft® Windows® Malicious Software Removal Tool, and a reputation data repository or service, which may be managed by Microsoft® or some other entity, that provides reputation data and/or rankings on various characteristics of applications, such as performance, security, and/or reliability.

In some embodiments, in addition to preventing certain undesirable applications from starting when the system is started up, any resources or utilities that may have been loaded onto the machine when those applications were installed (or perhaps at some later time) and that reference or otherwise utilize the applications being disabled may also be identified and disabled. Examples of such resources or utilities that may be linked to an application being disabled include file handler registrations, binary extensions, coder-decoder (CODEC) registrations, application-specific toolbar utilities, etc.

FIG. 1 is a functional block diagram showing examples of software modules that may be included in a system 100 and that may be used to identify and disable applications to rejuvenate a computer. The software modules depicted may, for example, reside in memory of, and be executed by, a computer such as that described below in connection with FIG. 2. As shown, in some embodiments, the system may employ three primary components: (1) an application list generator 102, (2) a decision engine 104, and (3) an application disabling module 106.

A rejuvenation process performed by the system 100 may be started automatically, e.g., based on performance or reliability measurements, or may be started at the initiative of the user. When rejuvenation is initiated, the application list generator 102 may identify various applications and services as candidates for possible disablement. In some embodiments, for example, the application list generator 102 may identify all binaries that are launched at start up and/or that continuously run or are otherwise determined to represent a significant drain on system resources.

Examples of ways in which applications today may start when a system starts include logon registry keys, start menu\programs\ startup, Explorer/IE extensions, scheduled tasks, services, drivers, boot executes, image hijacks, sidebar gadgets, etc. In some embodiments, the application list generator 102 may scan the system for entries of applications in one or more such hooks and include all such applications in its list of candidates for possible disablement.

The list of candidate binaries may then be passed to the decision engine 104, which may be responsible for determining whether any of the identified binaries should be disabled. As shown, the decision engine 104 may, for example, rely upon performance and reliability data 108 from the user's machine, information contained in a remote database 110 managed by the MSEC or some other entity, and/or a reputation service 112 that provides reputation data and/or rankings on various characteristics of applications, such as performance, security, and/or reliability. An examination of performance and reliability data 108 may, for example, involve an evaluation of factors such as crash rate, disk I/O, CPU usage, network usage, hang data, etc., of the binary. In some embodiments, data collected or generated by a performance measuring and reporting system of the operating system or other performance analysis tool, such as Event Tracing for Windows® (ETW) data, Software Quality Metrics (SQM) data, etc., on the user machine may be used to evaluate the machine's performance over time. Likewise, in some embodiments, a reliability tracking and reporting system of the operating system or other reliability analysis tool may additionally or alternatively be used to provide reliability information over time. A dedicated monitoring process may, for example, be launched at the event of system rejuvenation to identify applications that may be causing performance and reliability issues. In some embodiments, such a dedicated monitoring process may operate independently of, or may use data from, various performance and/or reliability tools.

As noted above, the MSEC maintains a database of potentially unwanted software that is used by the Microsoft® Windows® Malicious Software Removal Tool. This database may, for example, be remotely accessed by the decision engine 104 to identify programs that the user most likely does not want to use. The decision engine may additionally or alternatively remotely access reputation and/or ratings data from a remote database or service 112, and such data may be used as a metric to identify applications that have poor reliability and/or performance scores and target them for disabling. Such a service may, for example, allow software users to rate and/or rank software products on any of a variety of performance or reliability criteria. Any or all of the foregoing techniques may be used by the decision engine 104, either individually or in combination, to determine which applications should be disabled. The list of binaries to be disabled, as determined by the decision engine 104, may then be passed to the application disabling module 106.

The application disabling module 106 may, for example, stop all instances of the identified application from running and may also take steps to preclude the applications from starting automatically at system start up. In some embodiments, the application disabling module 106 may additionally identify all binaries that depend upon the applications targeted for disabling, e.g., by using data from a compatibility center of the operating system, e.g., an application identification subsystem 114, and may remove entries of those binaries from all auto-start locations. In some embodiments, the application disabling module 106 may also take further steps to clean up the system in view of the disabling of such binaries, such as by removing broken shortcuts, fixing open handlers, etc. Thus, in some embodiments, in addition to preventing certain undesirable applications from starting when the system is started up or otherwise, any resources or utilities that may have been loaded onto the machine when those applications were installed (or perhaps at some later time) and that reference or otherwise rely upon the applications being disabled may also be identified and disabled by the application disabling module 106. Examples of such resources or utilities that may be linked to an application being disabled include file handler registrations, binary extensions, CODEC registrations, application-specific toolbar utilities, etc.

In some embodiments, disabling an application may involve taking steps to completely eliminate the application's ability to automatically create processes on the user machine. Such an approach may ensure that the application will thereafter consume no system resources other than disk space. In some embodiments, the "active" components of the application, such as executable (EXE) files, Dynamic Link Library (DLL) files, etc., may be made inaccessible except by way a manual action taken by the user, such as through the use of a shortcut or selection of a start menu icon. As the disablement process may be employed without making irreversible changes to the machine, re-enabling the applications may be a trivial matter should the user affirmatively choose to do so. In some embodiments, for example, if a user attempts to launch a previously disabled application, the user may be warned that the application had been disabled for performance and/or reliability reasons, and may be asked to confirm that re-launching of the application is nonetheless desired. If the user so confirms, then the previously-disabled application may be re-enabled.

Figure 2:
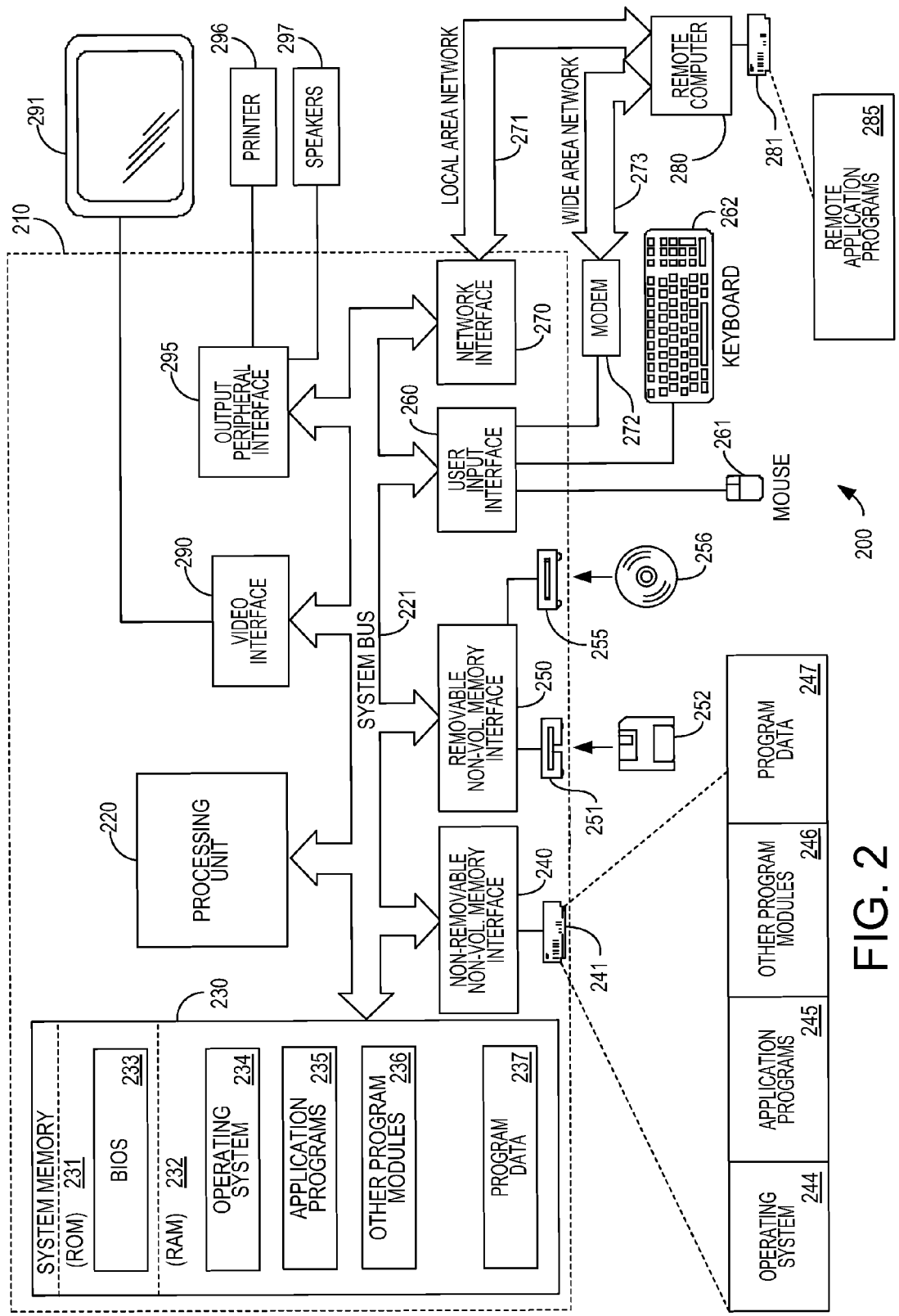
FIG. 2 illustrates an example of a suitable computing system environment on which embodiments of the invention may be implemented.

FIG. 2 illustrates an example of a suitable computing system environment 200 on which embodiments of the invention may be implemented. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200.

Embodiments of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc., that perform particular tasks or implement particular abstract data types. Embodiments of the invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing embodiments of the invention includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 230 may include computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 240 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices such as a keyboard 262 and pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 295.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code may be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks, or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
   with a computing device, identifying an application that consumes resources of the computing device, comprising:
      evaluating at least some data from a database that is remote from the computing device; and
      evaluating disk I/O usage, CPU usage, network usage, and hang data for the application;
   in response to the identification of the application, selectively disabling an ability of the identified application to start on the computing device without a user request or user authorization for starting the identified application;
   identifying one or more resources or utilities that utilize the disabled application; and
   disabling an ability of the one or more identified resources or utilities to utilize the disabled application without a user request or user authorization for the use.

2. The method of claim 1, wherein identifying the application further comprises:
   retrieving the at least some data from the database, the data regarding potentially undesirable applications.

3. The method of claim 1, wherein identifying the application further comprises:
   retrieving the at least some data from a remote software reputation service database.

4. The method of claim 3, wherein the at least some data retrieved from the remote software reputation service database comprises ratings or ranking data derived from information provided by software users.

5. The method of claim 1, wherein identifying the application further comprises:
   identifying applications that are to run continuously; and
   determining, for each of the identified applications that are to run continuously, whether to disable an ability of that application to start on the computing device without a user request or user authorization for starting that application.

6. The method of claim 1, wherein:
   the ability of the identified application to start is disabled without removing the identified application from the computing device; and
   the method further comprises prior to restarting the disabled application, prompting for authorization to restart that application.

7. The method of claim 1, wherein identifying the application further comprises:
   evaluating a crash rate for the application.

8. A computing device having at least a memory and a processor, wherein the memory and the processor are respectively configured to store and execute instructions, including instructions for:
   identifying an application that consumes resources of the computing device based at least in part on data from a database;
   identifying one or more resources or utilities that utilize the identified application;
   selectively disabling an ability of the identified application to start on the computing device, absent user input requesting or authorizing use of the identified application, based at least in part on disk I/O usage, CPU usage, network usage, and hang data for the identified application; and
   disabling an ability of the one or more identified resources or utilities to attempt to utilize the disabled application, absent user input requesting or authorizing such an attempt, based at least in part on the disk I/O usage, CPU usage, network usage, and hang data for the disabled application.

9. The computing device of claim 8, wherein the instructions are also for:
   retrieving information for identifying potentially undesirable applications from the database.

10. The computing device of claim 8, wherein the instructions are also for:
    retrieving the data from a remote software reputation service database.

11. The computing device of claim 10, wherein the data retrieved from the remote software reputation service database comprises ratings or ranking data derived from information provided by software users.

12. The computing device of claim 8, wherein the instructions are also for:
    identifying another application, the other application being configured to run continuously; and
    determining whether to disable startup of the other application absent user input requesting or authorizing the startup of that application.

13. The computing device of claim 8, wherein:
    the ability of the identified application to start is disabled without removing the identified application from the computing device; and
    the instructions are also for: prior to restarting the disabled application, prompting for authorization to restart the disabled application.

14. The computing device of claim 8, wherein the instructions are also for:
    evaluating a crash rate for the application.

15. A computer storage medium, not comprising a signal per se, having a plurality of instructions stored thereon, the instructions for causing the computing device to perform operations comprising:
    identifying an application that consumes resources of the computing device, wherein identifying the application comprises:

evaluating at least some data from a database that is external to the computing device;

identifying one or more resources or utilities that utilize the identified application; and evaluating disk I/O usage, CPU usage, network usage, and hang data for the identified application;

in response to the identification of the application, selectively disabling an ability of the identified application to start on the computing device absent user input requesting or authorizing use of the identified application; and disabling an ability of the one or more resources or utilities to utilize the disabled application absent user input requesting or authorizing such use.

16. The computer storage medium of claim 15, wherein identifying the application further comprises:

evaluating a crash rate for the application.

17. The computer storage medium of claim 15, wherein identifying the application further comprises:

retrieving the at least some data from the database, the at least some data including information for identifying potentially undesirable applications.

18. The computer storage medium of claim 15, wherein identifying the application further comprises:

retrieving the at least some data from a remote software reputation service database.

19. The computer storage medium of claim 18, wherein the at least some data retrieved from the remote software reputation service database comprises ratings or ranking data derived from information provided by software users.

20. The computer storage medium of claim 15, wherein identifying the application further comprises:

determining that the application is to run continuously; and determining whether to disable a startup ability of the application in response to the determination that the application is to run continuously.

* * * * *